United States Patent Office 2,920,091
Patented Jan. 5, 1960

2,920,091

TRANSESTERIFICATION PRODUCT OF GAMMA-CARBETHOXYPROPYLMETHYLDIETHOXYSILANE WITH ETHYLENE GLYCOL

William T. Black, Buffalo, N.Y., assignor to Union Carbide Corporation, a corporation of New York No Drawing. Application October 12, 1956
Serial No. 615,469

1 Claim. (Cl. 260—448.2)

The present invention relates to the synthesis of novel silicone derivatives. More particularly, the invention contemplates the provision of the unique group of organo functional disilane esters as represented in general by the following formula:

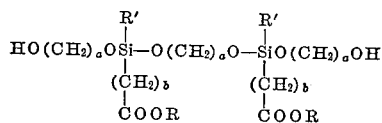

wherein R and R' represent monovalent hydrocarbon radicals, including both alkyl and aryl radicals; and ($a$) and ($b$) are integers from 2 to 10 inclusive.

The compounds of the invention are obtained by transesterification of carboalkoxypolymethylenedialkoxysilanes with diatomic alcohols of the aliphatic series such as ethanediol, propanediol, butanediol, etc. The carboalkoxy silanes employed as starting materials in the production of the compounds of the invention are obtained by the acid-alcoholysis of cyanopolymethylenechlorosilanes according to the process described and claimed in copending U.S. application Serial No. 615,492, filed jointly by me with Victor B. Jex and Donald L. Bailey concurrently with the present application. Suitable silanes of the general class described, including beta-substituted carboalkoxypolymethylene derivatives, are claimed in the aforementioned copending application.

The reaction of the diols and silanes can be effected by simply heating the reagents, preferably at the refluxing temperature of the alcohol employed, but a transesterification catalyst can be added to the reaction mixture if desired. For this purpose, I prefer to employ acids such as trifluoroacetic, perfluoroglutaric or any perfluoro organic acid or hydrogen chloride, since such acids are readily removable from the reaction system. When carrying out the transesterification reactions, I prefer to employ anhydrous conditions inasmuch as the reactions are reversible in nature.

The novel compounds of the invention find particular use as lubricants and antifoaming agents although they may be employed as intermediates in the production of a variety of silicones and organic derivatives.

It is believed that the invention may be best understood by reference to the following specific example which describes the preparation of a typical member of the generic group of compounds defined hereinbefore:

Example

Gamma-carbethoxypropylmethyldiethoxysilane, prepared by the acid alcoholysis of gamma-cyanopropylmethyldichlorosilane with ethanol, in amount 0.5 mole, and ethylene glycol, in amount 0.75 mole, were charged into a flask fitted with a stirrer and still head. The flask and contents were heated to 250° C. with stirring for five (5) hours. Ethanol was distilled off during this time; a total of 43.5 grams was collected as compared with 46 grams representing the theoretical amount for complete transesterification. The product was a very slightly viscous, clear, pale amber liquid whose structure was confirmed as being:

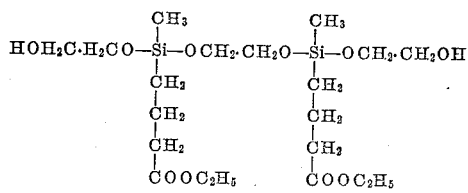

Infrared analysis of the compound showed absorption bands in the regions expected for C—OH; COOC₂H₅; CH₃—Si; SiOC; and C—C—O. No absorption was indicated for the COOCH₂CH₂OH structure.

The following analytical data were obtained for the compound:

|  | Theoretical | Actual |
|---|---|---|
| Molecular Weight | 498 | 758 |
| Silicon percent | 11.24 | 11.8 |
| Hydroxy do | 6.82 | 6.77 |
| Saponification No | 249 | 199 |

Having thus described the subject matter of my invention, what it is desired to secure by Letters Patent is:

A composition of matter consisting of a very slightly viscous, clear, pale amber liquid which exhibits infrared absorption bands in the regions corresponding to C—OH; COOC₂H₅; CH₃—Si; SiOC; and C—C—O groups; and having the saponification number 199, an hydroxy content of 6.77, and a silicon content of 11.8; said composition being obtained as the reaction product between gamma-carbethoxypropylmethyldiethoxysilane and ethylene glycol when reacted by transesterification at a temperature of about 250° C.

No references cited.

UNITED STATES PATENT OFFICE

CERTIFICATION OF CORRECTION

Patent No. 2,920,091                                         January 5, 1960

William T. Black

It is hereby certified that error appears in the above numbered patent requiring correction and that the said Letters Patent should read as corrected below.

Column 2, line 49, for "6.77" read -- 6.77% --; same line, for "11.8" read -- 11.8% --.

Signed and sealed this 6th day of June 1961.

(SEAL)
Attest:

ERNEST W. SWIDER                                      DAVID L. LADD
Attesting Officer                                          Commissioner of Patents